July 2, 1957 F. G. HODGES, JR., ET AL 2,797,741
CUSHION UNIT
Filed July 6, 1954 3 Sheets-Sheet 3
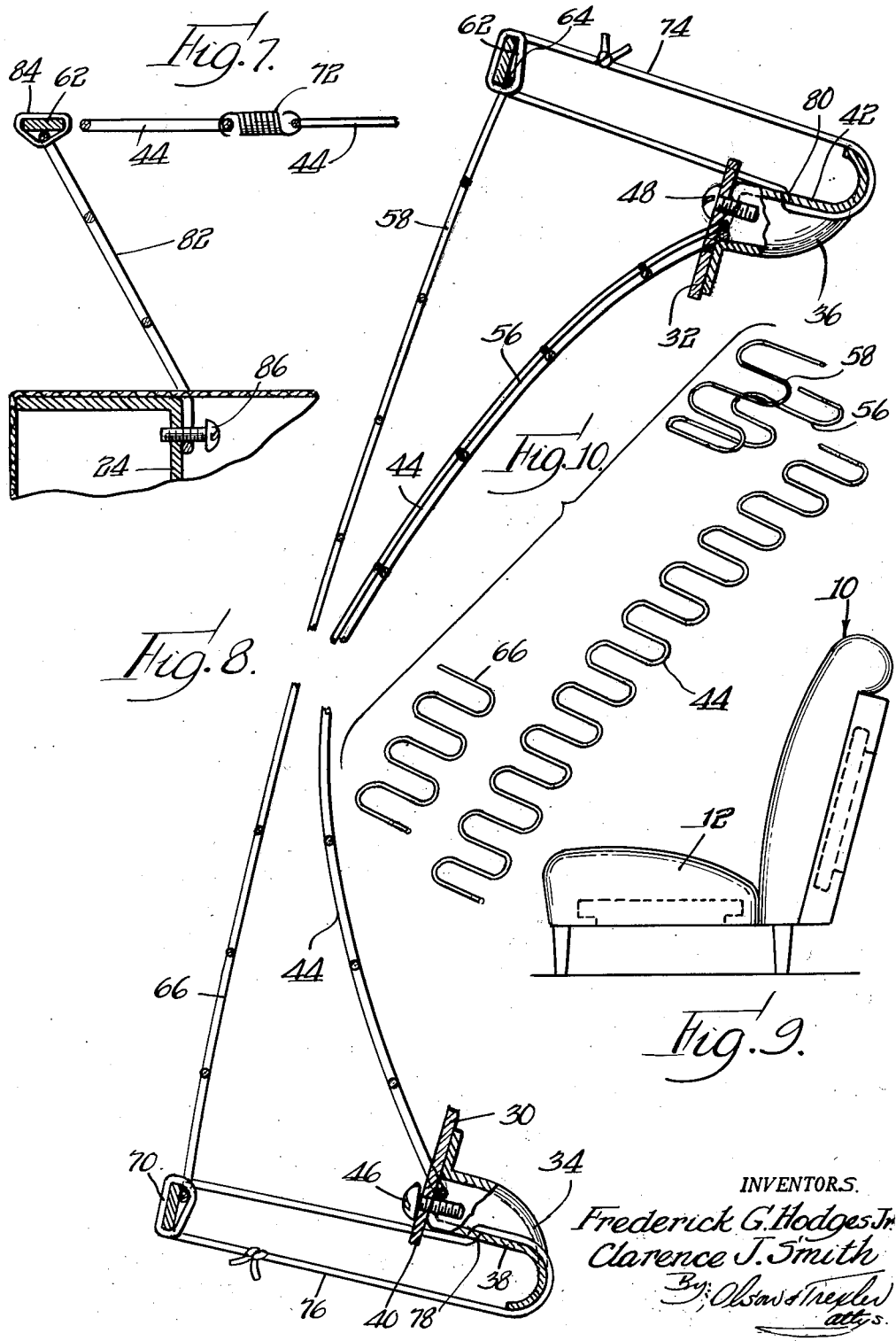
INVENTORS.
Frederick G. Hodges Jr.
Clarence J. Smith
By; Olson & Trexler
attys.

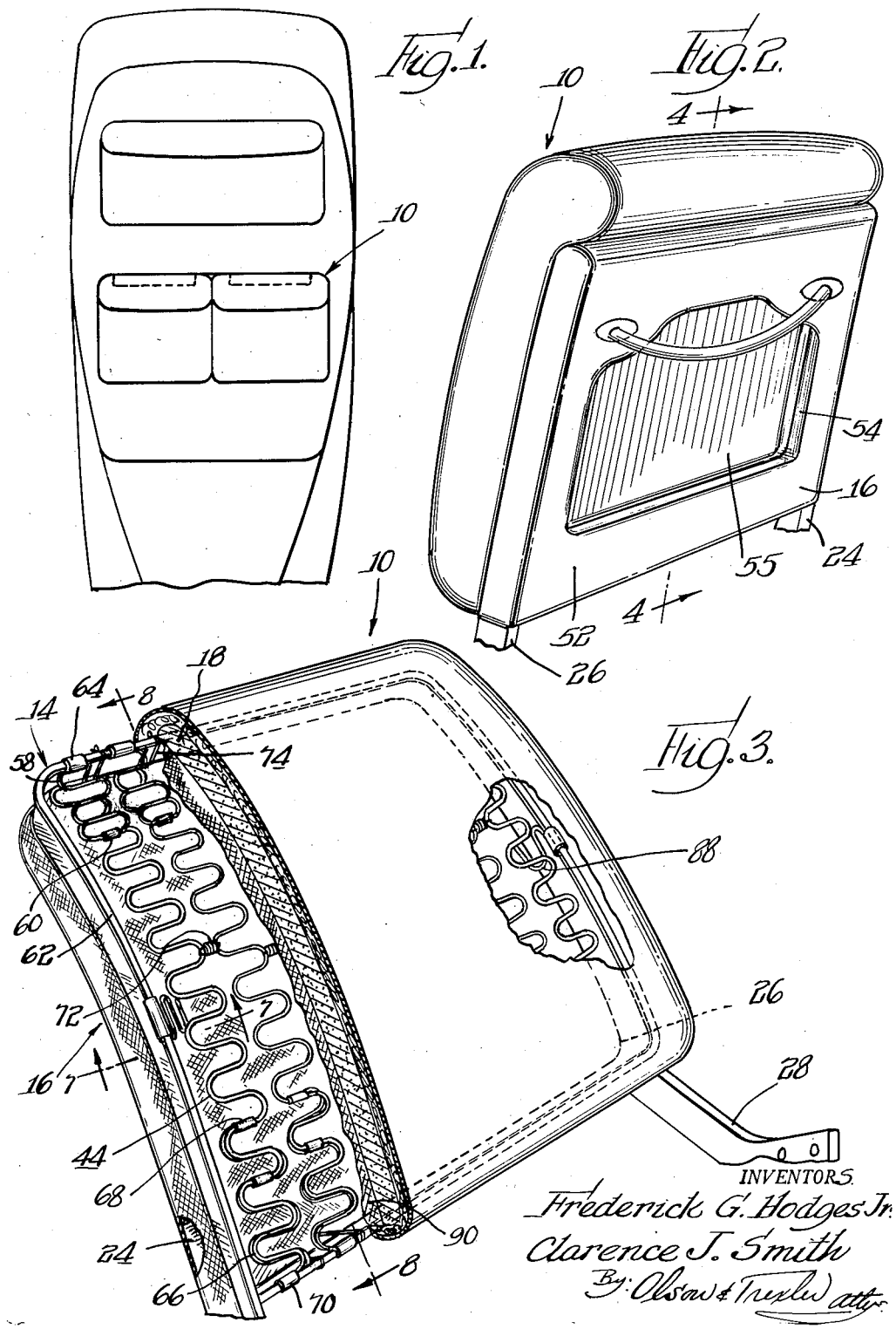

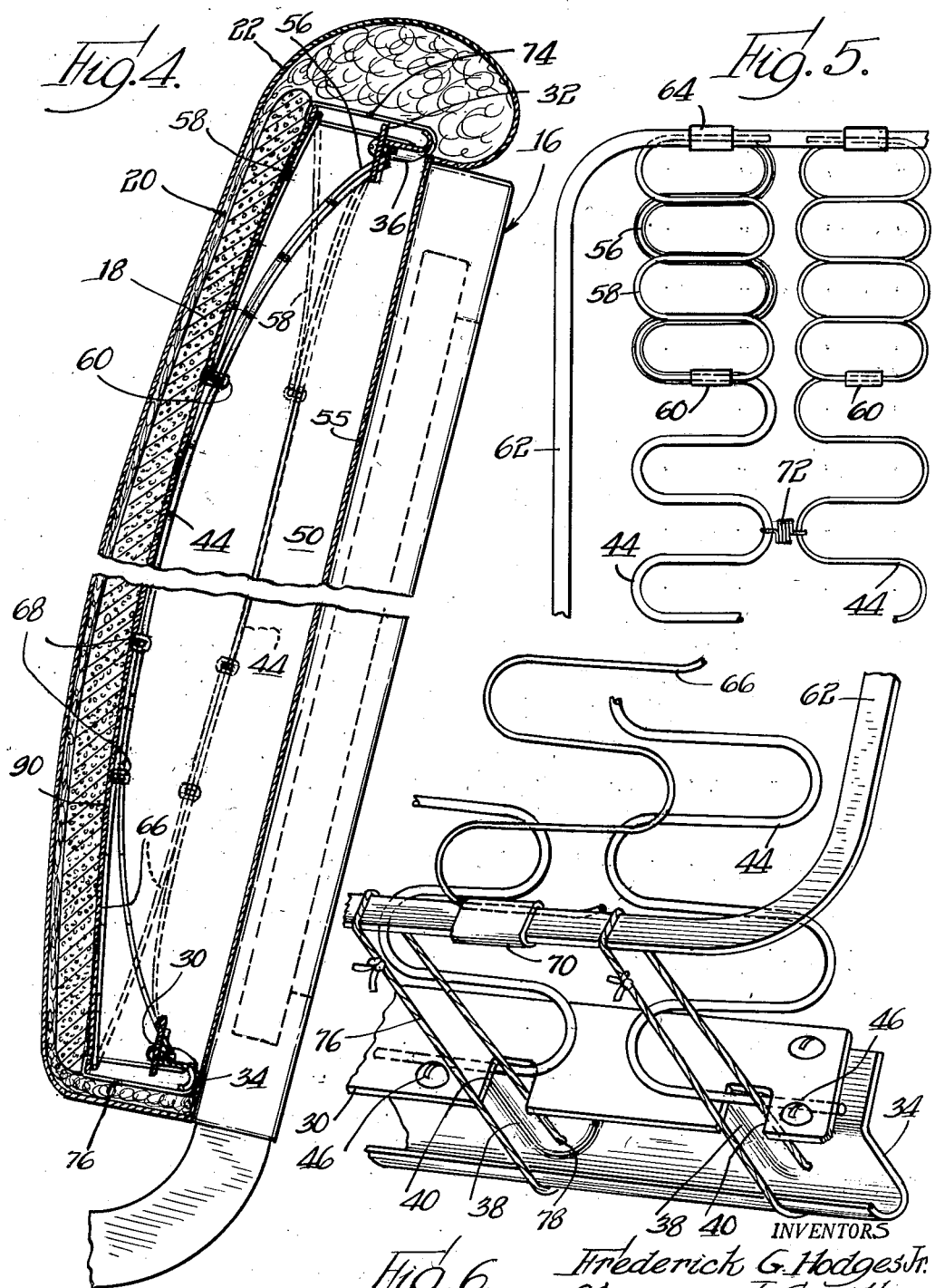

United States Patent Office 2,797,741
Patented July 2, 1957

2,797,741
CUSHION UNIT

Frederick G. Hodges, Jr., Lake Worth, Fla., and Clarence J. Smith, Rockford, Ill.

Application July 6, 1954, Serial No. 441,472

5 Claims. (Cl. 155—179)

The present invention relates to a novel cushion unit, and more particularly to a novel cushion unit especially adapted for use in seats for automobiles and the like.

Cushion units for automobiles, buses, trains, or the like must in general be constructed for comfort, while at the same time presenting a pleasing appearance and requiring a minimum of space. It is an object of the present invention to provide a novel seat cushion unit with improved comfort, while maintaining a pleasing appearance.

Another important object of the present invention is to provide a novel seat cushion unit having improved comfort characteristics and also increasing the space within a vehicle, and particularly when applied to an automobile—increasing leg room for the passengers in the automobile.

Other objects and advantages of the present invention will become apparent from the following description and the accompanying drawings, wherein:

Fig. 1 is a somewhat schematic plan view showing the application of the novel seat cushion units of this invention to an automobile;

Fig. 2 is a perspective view of a novel cushion unit embodying the principles of this invention;

Fig. 3 is a perspective view partially broken away to show the novel structural features of this invention;

Fig. 4 is a vertical cross section taken along line 4—4 in Fig. 2;

Fig. 5 is a fragmentary front elevational view of the upper portion of the novel spring structure of a cushion embodying the principles of this invention;

Fig. 6 is an enlarged fragmentary perspective view showing the novel structure of the lower portion of the cushion shown in Figs. 2 through 4;

Fig. 7 is a fragmentary cross sectional view taken along line 7—7 in Fig. 3;

Fig. 8 is a fragmentary cross sectional view taken along line 8—8 in Fig. 3;

Fig. 9 is a side elevational view showing a cushion unit embodying the principles of this invention adapted for use as both the seat and the back of an automobile seat structure; and Fig. 10 is an exploded perspective view illustrating the elements of the novel spring construction of the invention.

Referring more specifically to the drawings, wherein like parts are designated by the same numerals throughout the various figures, a cushion unit 10 especially adapted for use as the back of an automobile seat is illustrated in Figs. 1 through 4 and 9. Fig. 9 also shows a similar cushion unit 12 adapted for use as the seat of the automobile chair or seat structure.

Referring more specifically to Figs. 3 and 4, it is seen that the cushion unit 10 comprises a base spring unit 14 mounted on a frame 16. The base spring unit 14 is relatively stiff and is preferably covered by a relatively soft base pad 18, and, in addition, the top or surface padding 20 and upholstery 22. The manner in which the pad 18 and the padding 20 and upholstery 22 are applied may be conventional, and need not be described in detail.

The frame 16 includes a pair of generally upright channel members 24 and 26 having the usual bracket members, such as the bracket 28, secured to the botttom ends thereof, for mounting the back unit to the automobile seat or chair structure. The usual transverse bracing members, not shown, may be provided between the upstanding channels at their upper and lower ends in the conventional manner. A pair of sheet metal members 30 and 32 shown in Figs. 4, 6, and 8 overlie the frame 16 and extend transversely across the frame at its upper and lower ends. Members 30 and 32 may be secured to the frame by any suitable means, not shown. Beneath the members 30 and 32 there are mounted generally J-shaped channels 34 and 36. As shown best in Fig. 6, the generally J-shaped channel 34 is deformed to provide a plurality of offset portions 38 for a purpose more fully described hereinbelow. These offset portions are disposed in alignment with notches 40 cut in the overlying plate member 30. The J-shaped channel 36 is also provided with offset portions 42 in alignment with slots in the overlying plate 32 in substantially the same manner as the J-shaped channel 34.

A plurality of zig-zag flexure springs 44 are disposed as shown in Figs. 3, 4, and 8 so that they extend between the plate members 30 and 32. If desired, the flexure springs 44 along the opposite edges of the cushion may be constructed from heavier wire than the springs toward the mid portion of the cushion, as illustrated in Fig. 5, in order to reinforce the edges of the cushion. As shown best in Figs. 6 and 8, the ends of the flexure springs 44 are inserted beneath the plate members 30 and 32 through the slots in the plate members and are held in position by means of screws 46 and 48. It should be noted that the continuous zig-zag flexure springs 44 are bowed from their opposite ends forwardly away from the frame 16. This structure provides a hollow space 50 between the flexure springs and the frame.

As shown best in Fig. 2, the frame 16 which may be covered by a fabric 52 is constructed to provide a recess or opening 54 in the back of the cushion unit, this opening being bridged by a fabric or padding sheet 55 on the inner face of the frame overlying the above described hollow space between the frame 16 and the flexure springs 44. Thus, when the cushion unit 10 is installed in an automobile, as shown in Fig. 1, the recess 54 within the unit materially increases the leg room for passengers sitting on the rear seat of the automobile. In addition, when the principles of this invention are applied to the seat cushion 12, as shown in Fig. 9, additional space is provided beneath the seat for any desired purpose. This is especially useful in modern automobiles, wherein the seat structures are designed so that persons sitting in the rear of the automobile may extend their feet beneath the front seat or chair.

In order to reinforce the upper portions of the flexure springs 44, zigzag reinforcing springs bent to provide lower portions 56 superimposed on the upper ends of the springs 44 and upper portions 58 extending from an intermediate portion of the springs 44 rearwardly to a point above the plate member 32 are used. As shown best in Figs. 3, 4, and 10 the lower and the upper spring portions 56 and 58, respectively, are preferably formed integrally and secured to the flexure spring 44 by means of a tape or clip 60. As shown in Fig. 8, the free end of the lower portion 56 is preferably secured underneath the plate member 32 along with the end of the spring 44. The free end of the upper spring portion 58 is secured to a relatively lightweight flexible rectangular frame by a similar clip or tape 64. As shown best in Figs. 3, 5, 6, and 8, this frame 62 overlies the flexure springs 44 and substantially conforms with the shape of the main frame 16. The lower ends of the flexure springs 44 are also reinforced by a zigzag spring element 66 (see Figs. 3, 4, 6, 8 and 10) which is secured to the spring 44 by means of tapes 68 and to the frame 62 by a similar tape or clip 70, as shown best in Figs. 3, 4, and 8. As shown in the drawings, each of the zigzag reinforcing spring elements are connected to only one of the long springs 44 for individual reinforcement so that each spring 44 and its reinforcing springs conforms to the body of a person resting against the cushion unit without substantial twisting which would present relatively sharp uncomfortable corners. It should be noted that the reinforcing spring element 66 and the upper reinforcing spring portion 58 are disposed in substantially the same manner and combine with the mid portion of the long flexure springs 44 to provide a slightly curved surface for receiving the pad or cushion 18. By this structure, the complete cushion unit is shaped to provide desired comfort, while at the same time providing the above mentioned hollow space 50. In addition, the upper and lower portions of the cushion unit are made relatively rigid, while the mid portion is relatively yielding to the position shown in dotted lines in Fig. 4 to conform comfortably to the back of a person resting against the unit. It should be noted that the zigzag springs are always positioned forwardly of the frame 16 leaving the recess or opening 54 within the frame unobstructed for the purposes set forth above. In order to hold the zigzag flexure springs together, a plurality of short coil springs 72 are hooked between loops of adjacent springs 44, as shown best in Figs. 3 and 5. This structure also causes adjacent flexure springs 44 to reinforce each other and to flex together, thereby to cause the cushion unit gradually to conform with the back of a person resting against the unit.

As best shown in Figs. 6 and 8, the upper and lower ends of the rectangular frame 62 are connected with the J-shaped channels 36 and 34, respectively, by means of flexible cords 74 and 76. The cords 76 pass along the outer surface of the offset portions 38 of the J-shaped member and thence through apertures 78, and thence beneath the rounded bottom end of the J-shaped panel. The cords 74 are similarly arranged to pass through apertures 80 in the offset portions 42 of the generally J-shaped channel 36. It should be noted that the cords 74 and 76 are of such a length that the opposite ends of the frame 62 are pulled toward the generally J-shaped channels, thereby to flex the spring elements 58 and 60 and to place the flexure springs 44 under a predetermined initial load. This construction gives the cushion unit an initial comfortable firm feeling.

In order to prevent side sway of the springs, the sides of the frame 62 are connected with the generally upstanding channels of the frame 16. This structure is shown in Figs. 3 and 7, wherein a short zigzag flexure spring 82 has one end connected with the frame 62 by means of a tape or clip 84 and the other end secured to the generally upstanding channel 24 by any suitable means, such as a screw 86. The opposite side of the frame 62 is similarly connected with the generally upstanding channel 26 by a short zigzag flexure spring 88, as shown in Fig. 3. It should be noted that these short flexure springs 82 and 88 are inclined from their respective generally upstanding channel members 24 and 26 outwardly and transversely across the channels, as shown best in Fig. 7, to provide greater resistance to side sway of the frame 62, and hence the zigzag flexure springs 44.

From the above description, it is seen that the present invention provides a novel cushion unit which is fully capable of performing the objects set forth hereinabove. More specifically, it is seen that the present invention has provided a novel cushion unit which has improved comfort characteristics and which provides a recess for additional leg room and the like, especially when the unit is utilized in an automobile seat or chair. Furthermore, because of the novel spring construction of this invention, the surface of the springs to which the rubber pad or the like is applied is relatively even without sharp corners and, therefore, the usual separate insulator between the springs and the pad in prior art constructions is eliminated in the present structure. If desired the springs may be covered with a fabric 90 to restrict the entry of dust and the like.

While the preferred embodiment of the present invention has been shown and described herein, it is obvious that many changes may be made in the details of the disclosed structure without departing from the spirit and scope of the appended claims.

We claim:

1. A cushion assembly, comprising a rigid frame means, zigzag flexure spring means extending across and interconnected with opposite sides of said frame, said flexure spring means having zigzag elements bowed relatively sharply outwardly from said frame, said flexure spring means having other relatively slightly bowed zigzag elements overlying and connected to end portions of said first mentioned elements, each of said other zigzag elements being connected with only one of said first mentioned elements, a flexible frame surrounding said spring means and connected to said other zigzag elements, each of said opposite sides of said rigid frame means comprising a sheet material member having spaced notches therein respectively receiving ends of said first mentioned zigzag elements, and a second member secured to and extending from said first member and having a rounded marginal portion, cord-like elements connected with said flexible frame and respectively extending through said notches and around said rounded marginal portions, said cord-like elements being under tension so as to pull the flexible frame toward said rigid frame means and place said flexure spring means under a predetermined load, and padding means overlying said flexure spring means and conforming with said slightly bowed portions.

2. A cushion assembly, comprising a rigid frame, flexure spring means extending across and interconnected with one pair of opposite sides of said frame, said flexure spring means including one-piece zigzag spring elements connected to and bowed from said opposite sides outwardly of said frame to provide a hollow space between said flexure spring means and said frame, a flexible frame surrounding said spring means and disposed outwardly from said rigid frame, and reinforcing zigzag spring elements overlying opposite end portions of each of said first mentioned spring elements, each of said reinforcing spring elements having one end connected to said flexible frame and the other end connected with an intermediate portion of one of said first mentioned spring elements, each of the reinforcing zigzag spring elements at one end of said first mentioned spring elements including a first portion diverging from its associated first mentioned spring element and secured to said flexible frame and a second portion superimposed and substantially conforming with the end portion of its associated first mentioned spring element.

3. A cushion assembly, comprising a rigid open frame, covering means extending along one face of said frame, flexure spring means extending between one pair of opposite sides of said frame and overlying said covering means, said flexure spring means comprising relatively long zigzag spring elements completely traversing said rigid frame and connected to said opposite sides of said rigid frame and bowed outwardly from said rigid frame, a flexible frame surrounding said flexure spring means and disposed outwardly of said rigid frame, relatively short zigzag flexure spring elements extending inwardly from one side of said flexible frame adjacent one of said opposite sides of said rigid frame and interconnected with intermediate portions of said first mentioned spring elements, and other zigzag flexure spring elements including sections extending inwardly from an opposite side of said flexible frame and interconnected with intermediate portions of said first mentioned flexure spring elements and reversely bent sections conforming to said first mentioned spring elements and secured to said rigid frame so that opposite marginal portions of the cushion assembly are reinforced.

4. A cushion assembly, comprising a rigid open frame, covering means extending across one face of said frame, flexure spring means extending between and interconnected with one pair of opposite sides of said frame and overlying said covering means, said flexure spring means including zigzag elements extending between and secured to said opposite sides of said rigid frame, a flexible frame surrounding said flexure spring means and secured thereto, and flexure spring means connecting another pair of opposite sides of said rigid frame with adjacent opposite sides of said flexible frame, said last mentioned flexure spring means being inclined laterally outwardly from said rigid frame so as to resist side sway of said cushion assembly.

5. A cushion assembly, comprising a rigid frame, flexure spring means extending across and interconnected with one pair of opposite sides of said frame, said flexure spring means including one-piece zigzag spring elements connected to and bowed from said opposite sides outwardly of said frame to provide a hollow space between said flexure spring means and said frame, a flexible frame surrounding said spring means and disposed outwardly from said rigid frame, reinforcing zigzag spring elements overlying opposite end portions of each of said first mentioned spring elements, each of said reinforcing spring elements having one end connected to said flexible frame and another end connected with an intermediate portion of one of said first mentioned spring elements, each of the reinforcing zigzag spring elements at one end of said first mentioned spring elements including a first portion diverging from its associated first mentioned spring element and secured to said flexible frame and a second portion superimposed on and substantially conforming with the end portion of its associated first mentioned spring element, and additional zigzag spring elements connected with another pair of opposite sides of said rigid frame and inclined laterally and outwardly therefrom and connected to adjacent opposite sides of said flexible frame for resisting side sway of the cushion assembly.

References Cited in the file of this patent
UNITED STATES PATENTS

| | | |
|---|---|---|
| 2,274,176 | Widman | Feb. 24, 1942 |
| 2,526,184 | Williams et al. | Oct. 17, 1950 |
| 2,591,185 | Neely | Apr. 1, 1952 |
| 2,659,417 | Handren | Nov. 17, 1953 |
| 2,660,227 | Laurie | Nov. 24, 1953 |
| 2,669,292 | Asaro et al. | Feb. 16, 1954 |